United States Patent
Huang (10) Patent No.: US 7,631,123 B2
(45) Date of Patent: Dec. 8, 2009

(54) KVM SWITCH FOR SWITCHING AMONG COMPUTERS BY EMPLOYING MOUSE MOVEMENT SIGNAL AND METHOD THEREOF

(75) Inventor: Shih-yuan Huang, Sijhih (TW)

(73) Assignee: ATEN International Co., Ltd., Shijr (TW)

( * ) Notice: Subject to any disclaimer, the term of this patent is extended or adjusted under 35 U.S.C. 154(b) by 99 days.

(21) Appl. No.: 11/758,464

(22) Filed: Jun. 5, 2007

(65) Prior Publication Data

US 2008/0307119 A1    Dec. 11, 2008

(51) Int. Cl.
    *G06F 3/00*       (2006.01)
    *G06F 13/12*      (2006.01)
    *G06F 13/38*      (2006.01)
(52) U.S. Cl. .............................. 710/62; 710/15; 710/18
(58) Field of Classification Search .................... 710/62
See application file for complete search history.

(56) References Cited

U.S. PATENT DOCUMENTS 5,252,951 A * 10/1993 Tannenbaum et al. ....... 345/156
7,385,584 B2 * 6/2008 Segre ......................... 345/156
2005/0190148 A1 * 9/2005 Fujita ......................... 345/156

FOREIGN PATENT DOCUMENTS

TW             92219775       11/2003

OTHER PUBLICATIONS

HETEC DatenSysteme GmbH; "V-Switch quad : Installation and Operation Manual"; Version 1.31c; Jul. 31, 2006;pp. 18-25.*
C&C Technic Taiwan Co., Ltd discloses a KVM switch of Product ID: IC-A12-M in website— http://www.cctch.com.tw/products/showproduct.jsp?ID=97.

* cited by examiner

*Primary Examiner*—Alford W Kindred
*Assistant Examiner*—Zachary K Huson
(74) *Attorney, Agent, or Firm*—Chen Yoshimura LLP (57) ABSTRACT

A keyboard-video-mouse (KVM) switch and switching method thereof are disclosed. A KVM switch for switching among a plurality of computers includes a movement detector, control unit, and a switch unit. The movement detector detects a movement of a mouse to generate a movement signal. The control unit receives the movement signal from the movement detector and generates a control signal according to the movement signal. The switch unit switches the computers based on the control signal. The KVM performs switch operation among a plurality of computers by a switching threshold value according to a movement distance of a mouse during a set time period.

15 Claims, 5 Drawing Sheets

KVM SWITCH FOR SWITCHING AMONG COMPUTERS BY EMPLOYING MOUSE MOVEMENT SIGNAL AND METHOD THEREOF

FIELD OF THE INVENTION

The present invention relates to a keyboard-video-mouse (KVM) switch, and more particularly to a KVM switch for switching among a plurality of computers to select one of the computers by employing a mouse movement signal and switching method thereof.

BACKGROUND OF THE INVENTION

A keyboard-video-mouse (KVM) switch has been developed as an important solution for allowing a user to manage a plurality of computers via a console station, including a video monitor, keyboard, and mouse. Further, KVM cables are utilized to connect the KVM switch to each computer. The KVM switch enables the keyboard, video monitor and mouse to control more than one computer at a time. Basically, the user utilizes the video monitor, keyboard, and mouse to operate a currently selected computer, and utilizes a hot key on the keyboard or a port-selecting button on the KVM switch to switch the currently selected computer to a next selectable computer. The KVM switch transmits the switch signals among the computers and the video monitor, keyboard, and mouse depending on which computer is currently selected.

However, it is still inconvenient that the user must remember the hot key or move to press the port-selecting button in order to control the KVM switch. Further, TW patent application NO. 92219775, issued on Oct. 11, 2004, discloses a computer host switch that a control circuit controls a mouse to switch a plurality of computer hosts. However, because three or more keys of the mouse are needed and it is too complicated so that the control circuit cannot easily switch the computer hosts. In addition, the publication document in website: http://www.cctch.com.tw/products/showproduct.jsp?ID=97 discloses a KVM switch of Product ID: IC-A12-M. The KVM switch cannot effectively switch the computers via a mouse because of a complicated mouse clicking manner.

For the convenience of use, there is a need to provide a novel KVM switch for switching a plurality of computers using a mouse.

SUMMARY OF THE INVENTION

One object of the present invention provides a KVM switch to switch among a plurality of computers by a switching threshold value according to a movement distance of a mouse during a set time period.

The KVM switch includes a mouse driver, a bypass circuit, a switch unit, a movement detector, and a control unit. The mouse driver outputs a mouse signal from the mouse to the bypass circuit and the movement detector, respectively. The movement detector detects the movement of the mouse toward a first direction if the mouse is moved from a first side to a second side or toward a second direction if the mouse is moved from the second side to the first side for generating a movement signal and outputting the mouse movement signal to the control unit. Then, the control unit generates a control signal based on the movement signal from the movement detector. The movement detector can be implemented by hardware, firmware or even software. The switch unit switches among the computers to select one of the computers based on the control signal.

Please note that the movement detector can be a hardware circuit integrated into the control unit. Alternatively, the movement detector is a detection function provided to the control unit. The movement detector can be a section of a program executed by the control unit. That is, the control unit is able to detect the movement of the mouse, control the switch to select one of the computers, and route the mouse signal to the selected computer.

The KVM switch further includes a first distance register, a second distance register, and a timer. The timer is used for setting a set time period. During the setting time period, the first distance register accumulates a first movement distance to obtain a first accumulated movement distance if the mouse is moved toward the first direction, and the second distance register accumulates a second movement distance to obtain a second accumulated movement distance if the mouse is moved toward the second direction.

On one hand, if the set time period is expired, the control unit resets the first distance register and the second distance register for clearing the first accumulated movement distance and the second accumulated movement distance therein. Further, if the set time period of the timer is expired, the control unit resets the timer and then the timer times the set time period again. On the other hand, the control unit performs switching operation if the timer times according to the set time period and the timed period is within the set time period, i.e. the timed period does not exceed the set time period of the timer. That is, during the set time period, the control unit controls the switch unit to switch the computers correctly for selecting one of the computers.

The control unit reads the first accumulated movement distance from the first distance register and reads the second accumulated movement distance from the second distance register. The control unit determines that the computers are switched at a first switch direction or a second switch direction by comparing the first accumulated movement distance stored in the first distance register with the second accumulated movement distance stored in the second distance register.

If the comparison result is that the first accumulated movement distance is greater than or equal to the second accumulated movement distance, the control unit compares the first accumulated movement distance with a switching threshold value. If the first accumulated movement distance is greater than or equal to the switching threshold value, the control unit then controls the switch unit to switch from one currently selected computer to a previously selected computer at the first switch direction.

Similarly, if the comparison result is that the first accumulated movement distance is less than the second accumulated movement distance, the control unit compares the second accumulated movement distance with a switching threshold value. If the second accumulated movement distance is greater than or equal to the switching threshold value, the control unit then controls the switch unit to switch from one currently selected computer to a next selectable computer at the second switch direction.

According to the above-mentioned description, the present invention provides a KVM switch to switch among a plurality of computers by a switching threshold value according to a movement distance of a mouse during a set time period. The control unit is capable of detecting the movement of the mouse, controlling the switch to select one of the computers, and routing the mouse signal to the selected computer.

The present invention conveniently utilizes the mouse to switch to one selected computer among the computers and assuredly performs the operation of the selected computer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
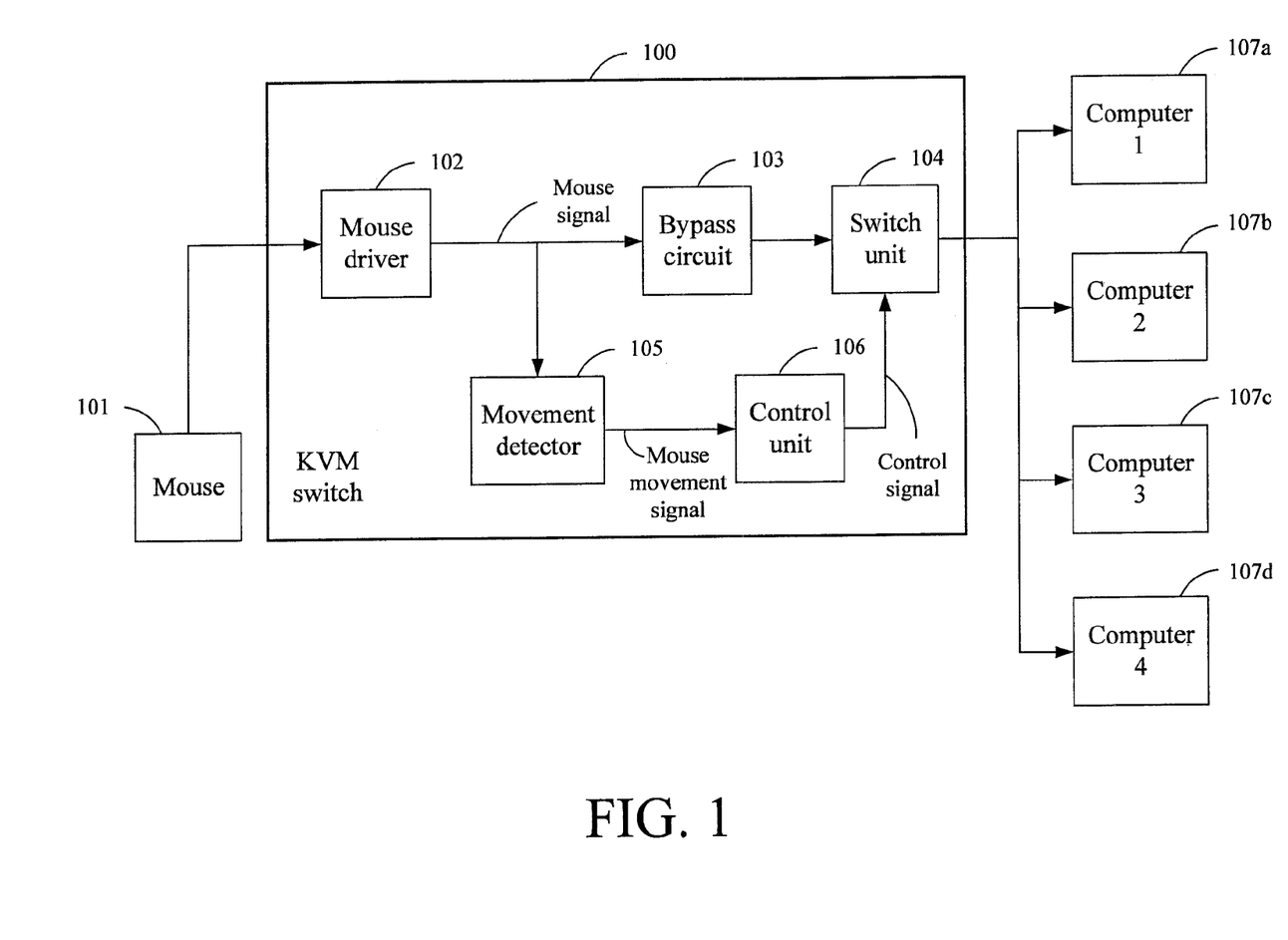
FIG. 1 shows a schematic diagram of KVM switch according to one embodiment of the present invention.

FIG. 1 shows a schematic diagram of a KVM switch 100 according to one embodiment of the present invention. A mouse 101 is coupled to a plurality of computers 107, such as computers 107a through 107d, respectively via the KVM switch 100. The KVM switch 100 further includes a mouse driver 102, a bypass circuit 103, a switch unit 104, a movement detector 105, and a control unit 106. The mouse driver 102 is coupled to the mouse 101. The bypass circuit 103 is coupled to the mouse driver 102. The movement detector 105 is coupled to the mouse driver 102. The control unit 106 is coupled to the movement detector 105. The switch unit 104 is coupled to the bypass circuit 103 and control unit 106.

The mouse driver 102 outputs a mouse signal from the mouse 101 to the bypass circuit 103 and the movement detector 105, respectively. The movement detector 105 detects the movement of the mouse 101 toward a first direction if the mouse 101 is moved from a first side to a second side or toward a second direction if the mouse 101 is moved from the second side to the first side for generating a movement signal and outputting the mouse movement signal to the control unit 106. The first direction may be opposite to the second direction. For example, the mouse 101 is moved from the left side to the right side for a switch operation. Then, the control unit 106 generates a control signal based on the movement signal from the movement detector 105. The movement detector 105 can be implemented by hardware, firmware or even software. The switch unit 104 switches among the computers 107a through 107d to select one of the computers 107a through 107d based on the control signal.

Referring to FIG. 1, please note that the movement detector 105 can be a hardware circuit integrated into the control unit 106. Alternatively, the movement detector 105 is a detection function provided to the control unit 106. The movement detector 105 can be a section of a program executed by the control unit 106. That is, the control unit 106 is able to detect the movement of the mouse 101, control the switch 104 to select one of the computers 107a through 107d, and route the mouse signal to the selected computer.

Figure 2:
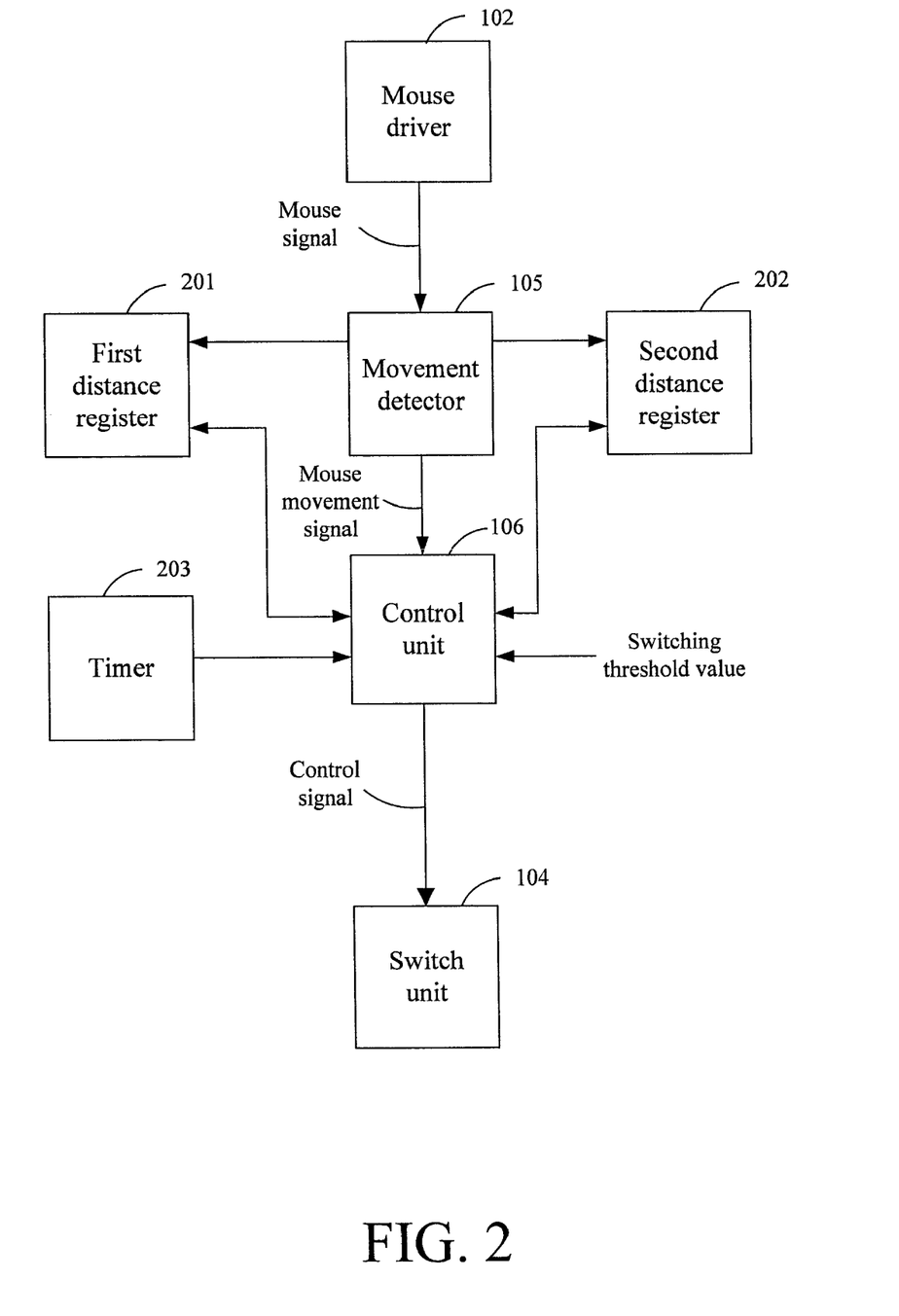
FIG. 2 shows a partially detailed schematic diagram of the KVM switch 100 shown in FIG. 1 according to one embodiment of the present invention.

Please refer to FIG. 2 which shows a partially detailed schematic diagram of the KVM switch 100 shown in FIG. 1 according to one embodiment of the present invention. The KVM switch 100 further includes a first distance register 201, a second distance register 202, and a timer 203, which are connected to the control unit 106, respectively. The first distance register 201 and second distance register 202 are further connected to the movement detector 105.

The timer 203 is used for setting a set time period, e.g. a predetermined time value. During the setting time period, the first distance register 201 accumulates a first movement distance to obtain a first accumulated movement distance if the mouse 101 is moved toward the first direction (i.e. from the first side to the second side), and the second distance register 202 accumulates a second movement distance to obtain a second accumulated movement distance if the mouse 101 is moved toward the second direction (i.e. from the second side to the first side). In one embodiment, the first distance register 201 and second distance register 202 continuously accumulates the first movement distance and second movement distance for allowing the control unit 106 to calculate movement distance during the set time period when the mouse 101 is moved toward the first direction or toward the second direction, respectively.

On one hand, if the set time period is expired, the control unit 106 resets the first distance register 201 and the second distance register 202 for clearing the first accumulated movement distance and the second accumulated movement distance therein. Further, if the set time period of the timer 203 is expired, the control unit 106 resets the timer 203 and then the timer 203 times the set time period again. On the other hand, the control unit 106 performs switching operation if the timer 203 times according to the set time period and the timed period is within the set time period, i.e. the timed period does not exceed the set time period of the timer 203. That is, during the set time period, the control unit 106 controls the switch unit 104 to switch the computers 107a through 107d shown in FIG. 1 correctly for selecting one of the computers 107a through 107d.

The control unit 106 reads the first accumulated movement distance from the first distance register 201 and reads the second accumulated movement distance from the second distance register 202. The control unit 106 determines that the computers 107a through 107d are switched at a first switch direction or a second switch direction by comparing the first accumulated movement distance stored in the first distance register 201 with the second accumulated movement distance stored in the second distance register 202.

If the comparison result is that the first accumulated movement distance is greater than or equal to the second accumulated movement distance, the control unit 106 compares the first accumulated movement distance with a switching threshold value. If the first accumulated movement distance is greater than or equal to the switching threshold value, the control unit 106 then controls the switch unit 104 to switch from one currently selected computer to a previously selected computer at the first switch direction. Please refer to FIG. 1 and FIG. 2. For example, if the first accumulated movement distance stored in the first distance register 201 is greater than or equal to the switching threshold value, the switch unit 104 switches the computer 107d to one of computer 107c, computer 107b, and computer 107a. That is, the switch unit 104 backwardly and circularly switches the computers (107a through 107d) by the order of computer 107d, computer 107c, computer 107b, and computer 107a.

Similarly, if the comparison result is that the first accumulated movement distance is less than the second accumulated movement distance, the control unit 106 compares the second accumulated movement distance with a switching threshold value. If the second accumulated movement distance is greater than or equal to the switching threshold value, the control unit 106 then controls the switch unit 104 to switch from one currently selected computer to a next selectable computer at the second switch direction. Please refer to FIG. 1 and FIG. 2. For example, if the second accumulated movement distance stored in the second distance register 202 is greater than or equal to the switching threshold value, the switch unit 104 switches the computer 107a to one of computer 107a, computer 107b, and computer 107c. That is, the switch unit 104 forwardly and circularly switches the computers (107a through 107d) by the order of computer 107a, computer 107b, computer 107c, and computer 107d.

According to the above-mentioned description, the present invention provides a KVM switch to switch among a plurality of computers by a switching threshold value according to a movement distance of a mouse during a set time period. The control unit 106 is capable of detecting the movement of the mouse 101, controlling the switch 104 to select one of the computers 107a through 107d, and routing the mouse signal to the selected computer.

Moreover, the control unit 106 determines whether the movement distance of the mouse 101 every time is greater than the one-step threshold value. If the movement distance of the mouse 101 is greater than or equal to the single distance threshold value, the control unit 106 recognizes that the mouse movement is for switching among the computers. Otherwise, if the movement distance of the mouse 101 is less than the single distance threshold value, the control unit recognizes that the mouse movement is for other operation (such as moving cursor) in the currently selected computer rather than switching operation.

In one embodiment, if the first accumulated movement distance is greater than or equal to the second accumulated movement distance and, meanwhile, a second movement distance at the second direction opposite to the first direction is detected, the control unit 106 determines whether the second movement distance is less than a one-step threshold value. If the decision result is "Yes", the control unit 106 resets the second distance register 202 to clear the second accumulated movement distance therein, and the control unit 106 further resets the timer 203 and then the timer 203 times the set time period again for performing a next switching operation of the KVM switch 100. Alternatively, if the first accumulated movement distance is less than the second accumulated movement distance and, meanwhile, a first movement distance at the first direction opposite to the second direction is detected, the control unit 106 determines whether the first movement distance is less than the one-step threshold value. If the decision result is "Yes", the control unit 106 resets the first distance register 201 to clear the first accumulated movement distance, and the control unit 106 further resets the timer 203 and then the timer 203 times the set time period again for performing a next switching of the KVM switch 100.

Figure 3A:
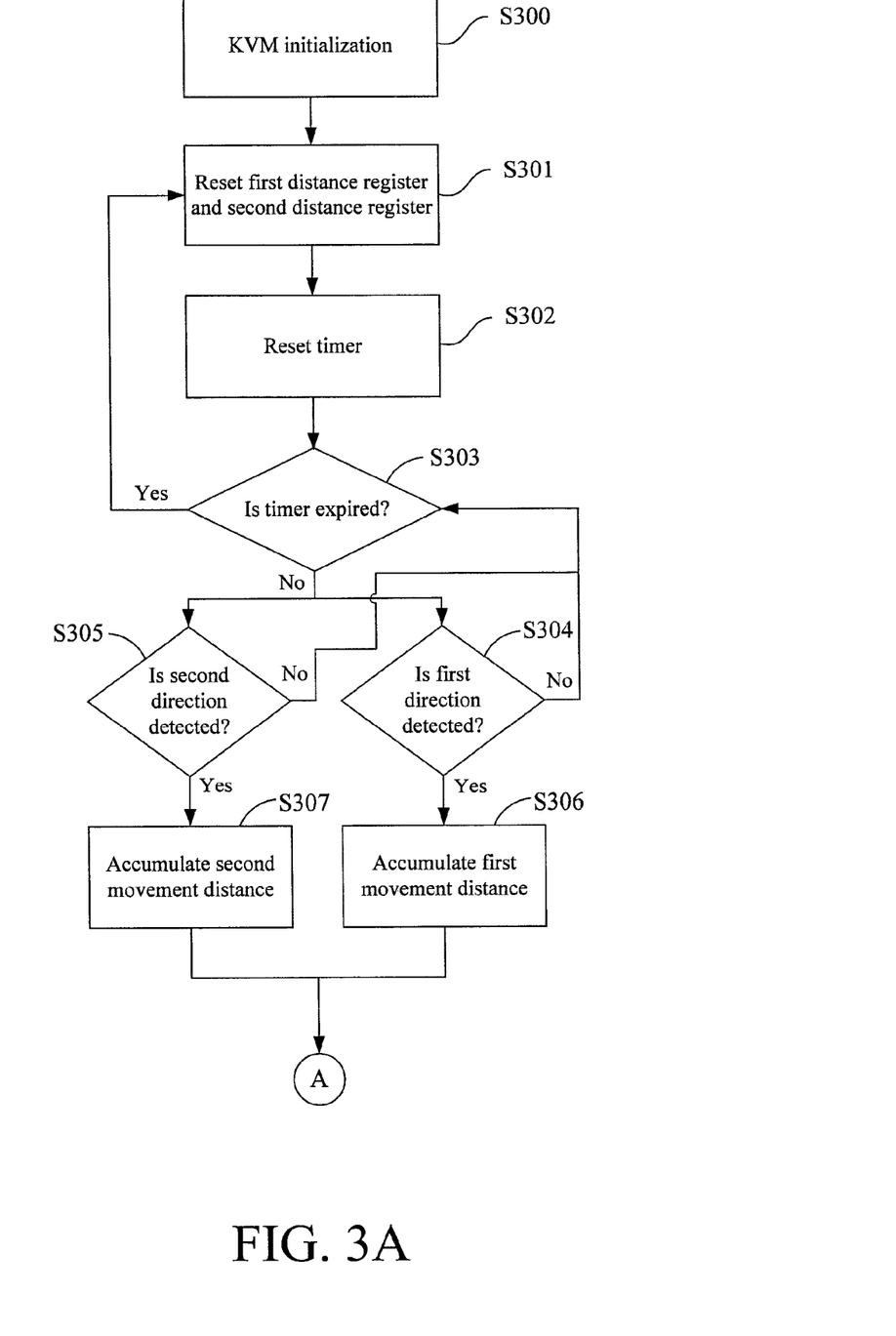
FIGS. 3A, 3B and 3C show a flow chart of performing the KVM switch according to one embodiment of the present invention.
Figure 3B:
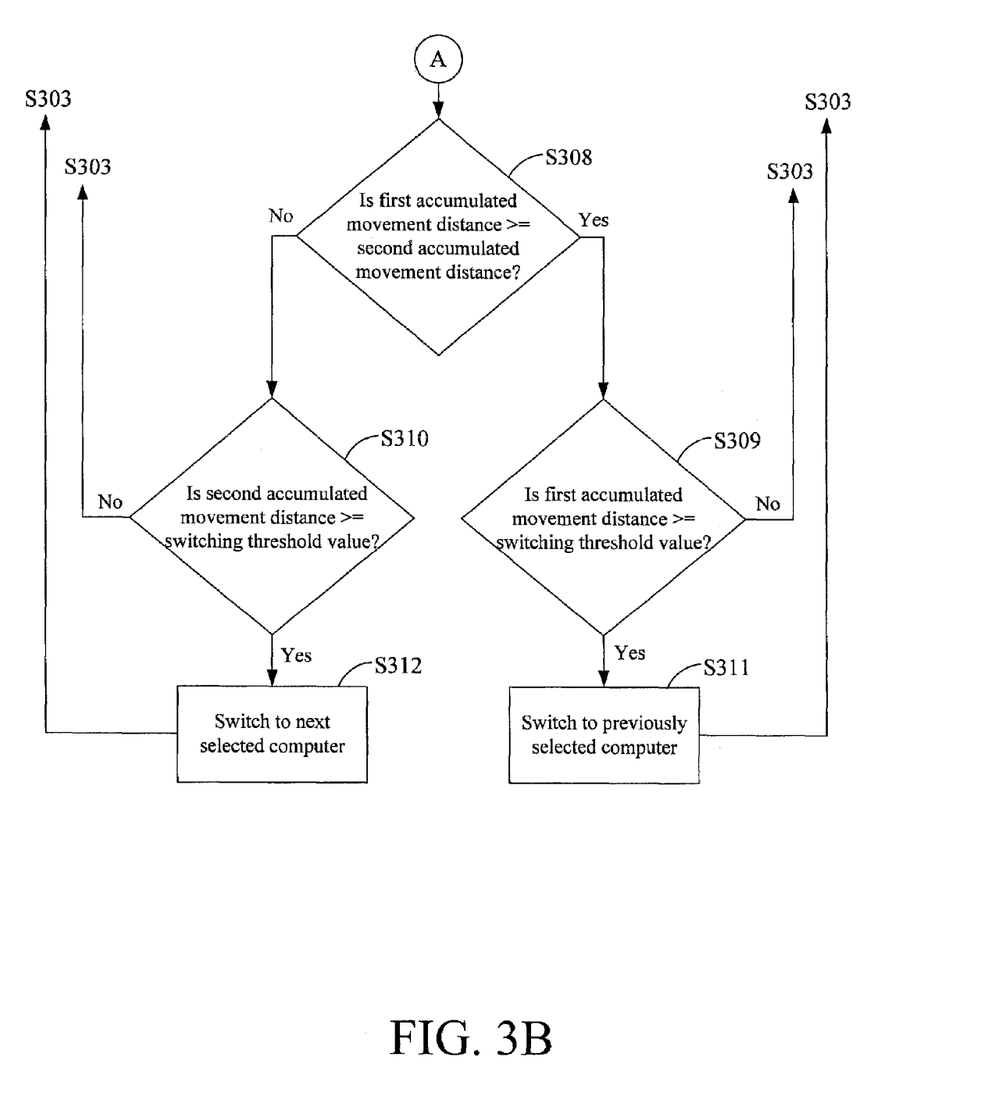
Figure 3C:
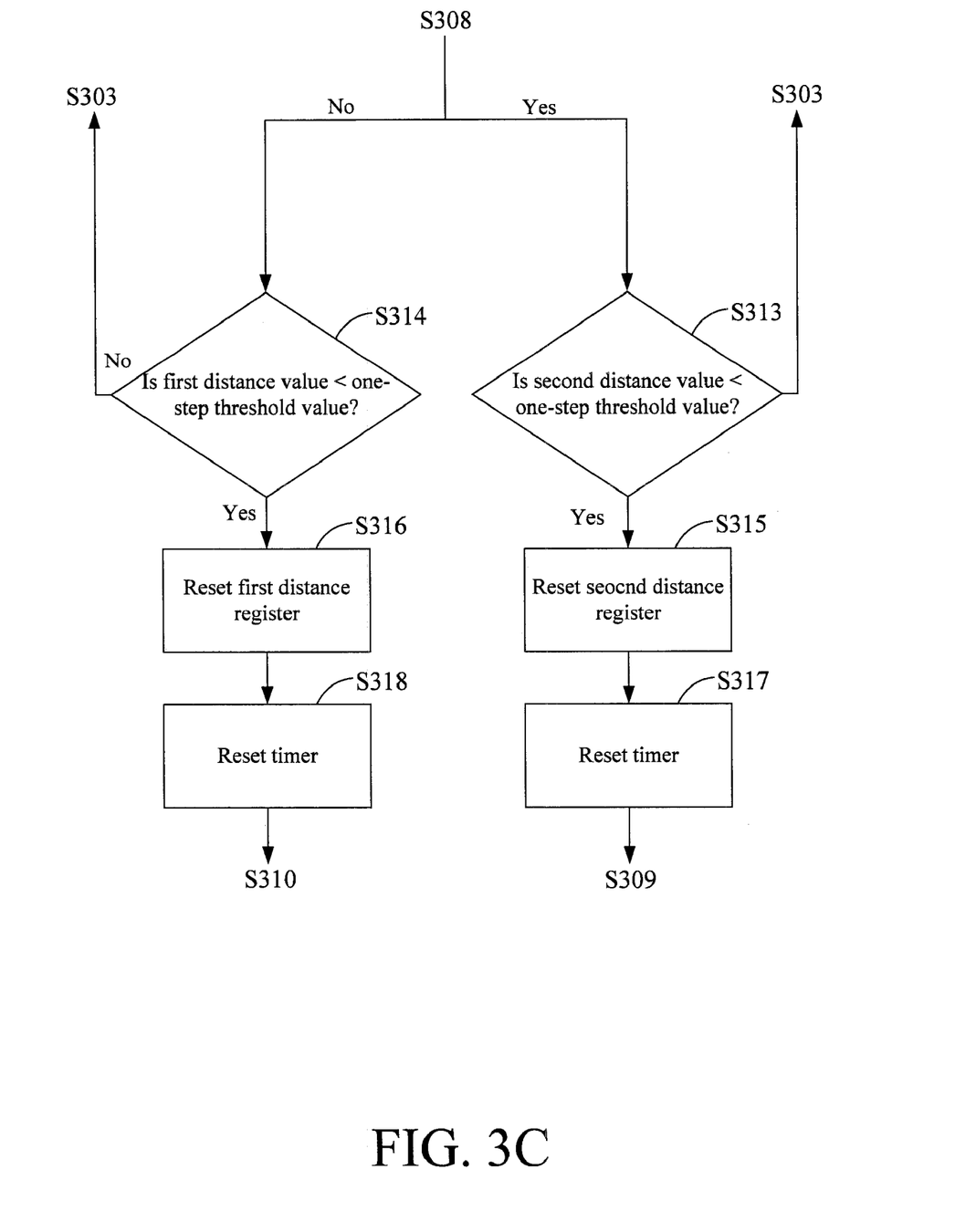

Please refer to FIGS. 1, 2, 3A, 3B and 3C. FIGS. 3A, 3B and 3C show flow charts of performing the KVM switch 100 shown in FIGS. 1 and 3 according to one embodiment of the present invention. The flow charts include the following steps.

In step S300, a KVM switch 100 performs an initialization procedure.

In step S301, the control unit 106 resets the first distance register 201 and second distance register 202 to clear the first accumulated movement distance and second accumulated movement distance therein, respectively.

In step S302, the control unit 106 resets the timer 203 and the timer 203 times a set time period of the timer 203 in order to start to perform switching operation of the KVM switch 100.

In step S303, the control unit 106 determines whether the set time period of the timer 203 is expired. If the decision result is "Yes", the control unit 106 resets the timer 203, the first distance register 201 and second distance register 202. If the timer 203 times according to the set time period and the timed period is within the set time period and the timed period does not exceed the set time period of the timer 203, i.e. the decision result is "No", the control unit 106 determines whether the mouse 101 is moved toward the first direction (i.e. from the first side to the second side) or toward the second direction (i.e. from the second side to the first side).

In step S304, when the set time period of the timer 203 is in duration, the control unit 106 determines whether a first direction is detected by the movement detector 105. If the decision result is "Yes", the control unit 106 controls the movement detector 105 for putting the first movement distance into first distance register 201. If the decision result is "No" and the first direction is not detected by the movement detector 105, go to step S303.

In step S306, the first distance register 201 continuously accumulates the first movement distance when the decision result in step S304 is "Yes".

In step S305, when the set time period of the timer 203 is in duration, the control unit 106 determines a second direction is detected by the movement detector 105. If the decision result is "Yes", the control unit 106 controls the movement detector 105 for putting the first movement distance into first distance register 201. If the decision result is "No" and the second direction is not detected by the movement detector 105, go to step S303.

In step S307, the second distance register 202 continuously accumulates the second movement distance when the decision result in step S305 is "Yes".

Please refer to the FIG. 3B. In step S308, the control unit 106 compares the first accumulated movement distance with the second accumulated movement distance to determine that the first accumulated movement distance is greater than or equal to the second accumulated movement distance. If the decision result is "Yes", proceed to step S309. If the decision result is "No", proceed to step S1.

In step S309, when the first accumulated movement distance is greater than or equal to the second accumulated movement distance, the control unit 106 compares first accumulated movement distance with the switching threshold value. If the decision result is "Yes" is step S309, the control unit 106 then controls the switch unit 104 to switch from one currently selected computer to a previously selected computer at the first switch direction during the set time period as shown in step S311. If the decision result is "No" in step S309, go to step S303.

In step S310, when the first accumulated movement distance is less than the second accumulated movement distance, the control unit 106 compares second accumulated movement distance with the switching threshold value. If the decision result is "Yes" in step S310, the control unit 106 then controls the switch unit 104 to switch from one currently selected computer to a next selectable computer at the second switch direction during the set time period as shown in step S312. If the decision result is "No" in step S310, go to step S303.

Please refer to FIG. 3C. If the first accumulated movement distance is greater than or equal to the second accumulated movement distance after the step S40, the flow chart further include the following steps.

In step S313, when the first accumulated movement distance is greater than or equal to the second accumulated movement distance and meanwhile a second movement distance at the second direction opposite to the first direction is detected, the control unit 106 determines whether the second movement distance is less than a one-step threshold value. If the decision result is "Yes", proceed to steps S315 and S317. If the decision result is "No", go to the step S303.

In step S315, when the decision result in step S313 is "Yes", the control unit 106 resets the second distance register 202 to clear the second accumulated movement distance therein.

In step S317, when the decision result in step S313 is "Yes", the control unit 106 resets the timer 203 and then the timer 203 times the set time period again for performing a next switching operation of the KVM switch 100.

Please refer to FIG. 3C continuously. If the first accumulated movement distance is less than the second accumulated movement distance after the step S40, the flow chart further include the following steps.

In step S314, when the first accumulated movement distance is less than the second accumulated movement distance and meanwhile a first movement distance at the first direction opposite to the second direction is detected, the control unit 106 determines whether the first movement distance is less than the one-step threshold value. If the decision result is "Yes", proceed to steps S316 and S318. If the decision result is "No", go to the step S303.

In step S316, when the decision result in step S314 is "Yes", the control unit 106 resets the first distance register 201 to clear the first accumulated movement distance.

In step S318, when the decision result in step S314 is "Yes", the control unit 106 resets the timer 203 and then the timer 203 times the set time period again for performing a next switching of the KVM switch 100.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A keyboard-video-mouse (KVM) switch for switching among a plurality of computers, the KVM switch comprising:
   a movement detector, detecting a movement of a mouse to generate a movement signal;
   a control unit coupled to the movement detector, generating a control signal based on the movement signal from the movement detector;
   a switch unit coupled to the control unit and the computers, switching among the computers to select one of the computers based on the control signal;
   a timer coupled to the control unit for timing a set time period, wherein the control unit resets the timer when the set time period of the timer is expired;
   a first distance register coupled to the movement detector and the control unit, accumulating a first movement distance during the set time period when the mouse is moved at a first direction if the timer times according to the set time period and the timed period is within the set time period; and
   a second distance register coupled to the movement detector and the control unit, accumulating a second movement distance during the set time period when the mouse is moved at a second direction if the timer times according to the set time period and the timed period is within the set time period;
   wherein the control unit compares the first accumulated movement distance and the second accumulated movement distance; and
   wherein the control unit compares one of the first and second accumulated movement distances with a switching threshold value.

2. The KVM switch according to claim 1, wherein the control unit compares the first accumulated movement distance with the switching threshold value when the first accumulated movement distance exceeds the second accumulated movement distance during the set time period.

3. The KVM switch according to claim 2, wherein the control unit controls the switch unit to switch from one currently selected computer to previously selected computer when the first accumulated movement distance exceeds the second accumulated movement distance and the first accumulated movement distance exceeds the switching threshold value.

4. The KVM switch according to claim 1, wherein the control unit compares the second accumulated movement distance with the switching threshold value when the second accumulated movement distance exceeds the first accumulated movement distance during the set time period.

5. The KVM switch according to claim 4, wherein the control unit controls the switch unit to switch from one currently selected computer to next selectable computer when the second accumulated movement distance exceeds the first accumulated movement distance and the second accumulated movement distance exceeds the switching threshold value.

6. A keyboard-video-mouse (KVM) switch comprising:
   a mouse driver, generating a mouse signal;
   a movement detector, detecting the mouse signal of the mouse driver to generate a movement signal;
   a control unit coupled to the movement detector, generating a control signal based on the movement signal from the movement detector;
   a switch unit coupled to the control unit and the computers, switching among the computers to select one of the computers based on the control signal;
   a timer coupled to the control unit for timing a set time period, wherein the control unit resets the timer when the set time period of the timer is expired;
   a first distance register coupled to the movement detector and the control unit, accumulating a first movement distance during the set time period when the mouse is moved at a first direction if the timer times according to the set time period and the timed period is within the set time period; and
   a second distance register coupled to the movement detector and the control unit, accumulating a second movement distance during the set time period when the mouse is moved at a second direction if the timer times according to the set time period and the timed period is within the set time period;
   wherein the control unit compares the first accumulated movement distance and the second accumulated movement distance; and
   wherein the control unit compares one of the first and second accumulated movement distances with a switching threshold value.

7. The KVM switch according to claim 6, wherein the control unit compares the first accumulated movement distance with the switching threshold value when the first accumulated movement distance exceeds the second accumulated movement distance during the set time period.

8. The KVM switch according to claim 7, wherein the control unit controls the switch unit to switch from one currently selected computer to previously selected computer when the first accumulated movement distance exceeds the second accumulated movement distance and the first accumulated movement distance exceeds the switching threshold value.

9. The KVM switch according to claim 6, wherein the control unit compares the second accumulated movement distance with the switching threshold value when the second accumulated movement distance exceeds the first accumulated movement distance during the set time period.

10. The KVM switch according to claim 9, wherein the control unit controls the switch unit to switch from one currently selected computer to next selectable computer when the second accumulated movement distance exceeds the first accumulated movement distance and the second accumulated movement distance exceeds the switching threshold value.

11. A method for switching a plurality of computers, the method comprising the steps of:
   detecting a movement distance of a mouse to generate a movement signal;
   receiving the movement signal for generating a control signal;
   switching the computers based on the control signal;
   timing a set time period;
   resetting the timer when the set time period is expired;
   accumulating a first movement distance when the mouse is moved at a first direction if the timed period is within the set time period;
   accumulating a second movement distance when the mouse is moved at a second direction if the timed period is within the set time period;
   comparing the first accumulated movement distance and the second accumulated movement distance; and
   comparing one of the first and second accumulated movement distances with a switching threshold value.

12. The method according to claim 11, further comprising a step of comparing the first accumulated movement distance with a switching threshold value when the first accumulated movement distance exceeds the second accumulated movement distance during the set time period.

13. The method according to claim 12, further comprising a step of switching one currently selected computer to a previously selected computer when the first accumulated movement distance into the first distance register exceeds a switching threshold value during the set time period.

14. The method according to claim 11, further comprising a step of comparing the second accumulated movement distance with the switching threshold value when the second accumulated movement distance exceeds the first accumulated movement distance during the set time period.

15. The method according to claim 14, further comprising a step of switching one currently selected computer to a next selectable computer when the second accumulated movement distance into the second distance register exceeds the switching threshold value during the set time period.

* * * * *